(12) United States Patent
Kawamura et al.

(10) Patent No.: US 7,725,245 B2
(45) Date of Patent: May 25, 2010

(54) THROTTLE VALVE CONTROL SYSTEM FOR INTERNAL COMBUSTION ENGINE

(75) Inventors: Kazunori Kawamura, Wako (JP); Futoshi Nishioka, Wako (JP); Osamu Kitamura, Tochigi (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 12/289,189

(22) Filed: Oct. 22, 2008

(65) Prior Publication Data

US 2009/0112448 A1    Apr. 30, 2009

(30) Foreign Application Priority Data

Oct. 30, 2007 (JP) .............................. 2007-281087
Jun. 2, 2008 (JP) .............................. 2008-144826

(51) Int. Cl.
F02D 11/10 (2006.01)

(52) U.S. Cl. ........................................ 701/110; 123/399

(58) Field of Classification Search ................. 123/399, 123/396, 339.22, 339.23, 339.24, 406.46, 123/406.47, 406.5, 506.51, 406.52, 406.53, 123/406.54, 406.55, 435, 436, 491, 492, 123/1 A, 198 A; 701/110
See application file for complete search history.

(56) References Cited

U.S. PATENT DOCUMENTS

| | | | | |
|---|---|---|---|---|
| 4,462,360 A | * | 7/1984 | Kobayashi et al. | 477/111 |
| 4,765,295 A | * | 8/1988 | Ishikawa et al. | 123/399 |
| 4,993,386 A | * | 2/1991 | Ozasa et al. | 123/25 J |
| 5,492,095 A | * | 2/1996 | Hara et al. | 123/339.19 |
| 5,727,523 A | * | 3/1998 | Suzuki et al. | 123/399 |
| 6,182,635 B1 | * | 2/2001 | Nishida | 123/399 |
| 6,199,535 B1 | * | 3/2001 | Hara | 123/396 |
| 6,520,148 B2 | * | 2/2003 | Yonezawa et al. | 123/399 |
| 6,701,891 B2 | * | 3/2004 | Niki et al. | 123/396 |
| 6,786,199 B2 | * | 9/2004 | Oda et al. | 123/399 |
| 6,816,772 B2 | * | 11/2004 | Kondo | 701/103 |
| 6,845,749 B2 | * | 1/2005 | Kubo | 123/339.11 |
| 7,017,548 B2 | * | 3/2006 | Sawada et al. | 123/339.11 |

(Continued)

FOREIGN PATENT DOCUMENTS

DE     102 49 184 A1    4/2003

(Continued)

OTHER PUBLICATIONS

European Search Report, EP 08 01 8334, dated Feb. 11, 2009.

*Primary Examiner*—Hai H Huynh
(74) *Attorney, Agent, or Firm*—Squire, Sanders & Dempsey, LLP

(57) ABSTRACT

A throttle valve control system for an internal combustion engine which controls an opening of a throttle valve of the engine so that the opening coincides with a target opening. A regulation value of a change amount of the throttle valve opening is set according to at least a temperature parameter indicative of a temperature of the engine. The target opening is set within a range defined by the regulation value. An upper limit value and a lower limit value of the regulation value is set according to the temperature parameter, and a transition control is performed wherein the regulation value is set according to an elapsed time period after start of the engine so as to change from the lower limit value to the upper limit value.

21 Claims, 8 Drawing Sheets

U.S. PATENT DOCUMENTS

| | | | | |
|---|---|---|---|---|
| 7,240,665 B2 * | 7/2007 | Hoshino et al. | ............. | 123/399 |
| 7,418,946 B2 * | 9/2008 | I et al. | ................... | 123/406.45 |
| 2009/0112443 A1 * | 4/2009 | Kawamura et al. | .......... | 701/103 |
| 2009/0205613 A1 * | 8/2009 | Kawakita et al. | ....... | 123/406.44 |

FOREIGN PATENT DOCUMENTS

| | | |
|---|---|---|
| EP | 1 079 089 A2 | 2/2001 |
| JP | 3-13541 | 3/1991 |
| JP | 3044719 | 3/2000 |
| WO | WO 2004/090308 A1 | 10/2004 |

* cited by examiner

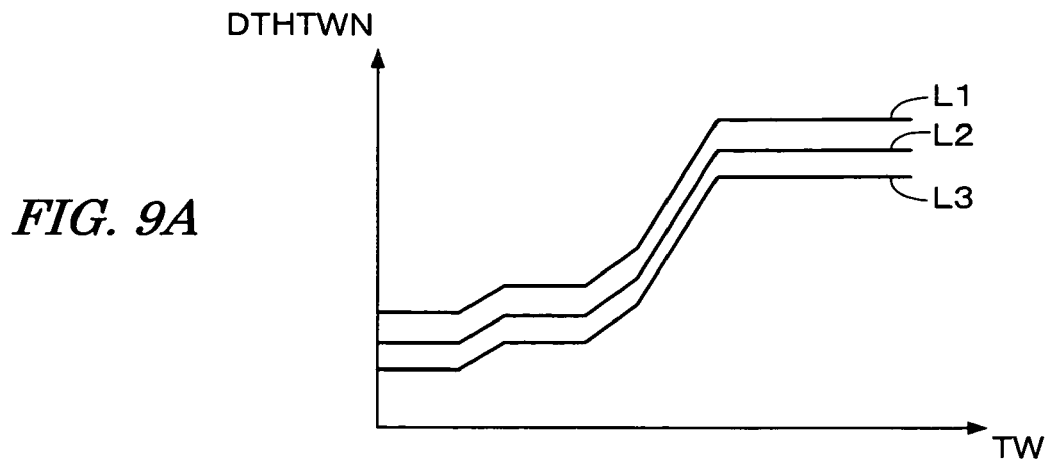
*FIG. 9A*
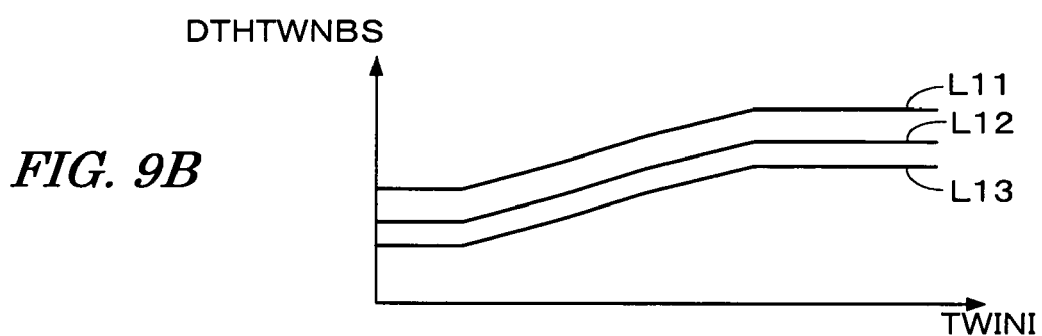
*FIG. 9B*
*FIG. 10*
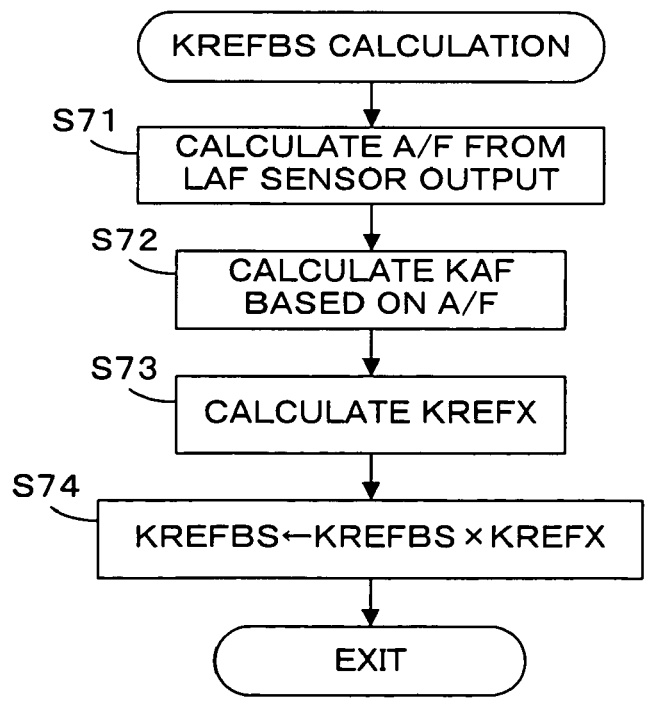

THROTTLE VALVE CONTROL SYSTEM FOR INTERNAL COMBUSTION ENGINE

BACKGROUND OF THE INVENTION

1. Field of the Invention

The present invention relates to a throttle valve control system for an internal combustion engine, and particularly to a throttle valve control system which suppresses a rapid opening of a throttle valve of the engine immediately after a cold start of the engine.

2. Description of the Related Art

Japanese Utility Model Publication No. H3-13541 (JU-'541) discloses a throttle control system which sets a valve opening speed of a throttle valve according to a warm-up condition of the engine. According to this system, when an engine coolant temperature is less than a predetermined temperature, the valve opening speed is regulated to a value equal to or less than a maximum speed corresponding to the engine coolant temperature. The regulation of the valve opening speed prevents the throttle valve from rapidly opening immediately after the cold start of the engine, thereby preventing an air-fuel ratio of the air-fuel mixture to be supplied to the engine from becoming lean.

Further, Japanese Patent Publication No. 3044719 (JP-'719) discloses a method for controlling the valve opening speed of the throttle valve according to an alcohol concentration in the fuel containing alcohol. According to this method, when calculating the throttle valve opening speed from a depressing speed of an accelerator, the throttle valve opening speed is controlled so as to become lower as the alcohol concentration increases.

A temperature in the combustion chamber of the engine, which most significantly affects the combustion state of the engine, increases as an elapsed time period from the engine start (from the time the self-sustaining operation of the engine starts) becomes longer. However, this point is not taken into consideration in the system of JU-'542. That is, when the temperature in the combustion chamber increases, there is a delay until the engine coolant temperature increases. Therefore, the increasing speed of the throttle valve opening is suppressed when the engine coolant temperature is low, and the drivability of the engine may deteriorate.

Further, the method shown in JP-'719 aims to maintain a degree of acceleration corresponding to the accelerator operation regardless of the alcohol concentration. Therefore, JP-'719 does not provide a method for preventing deterioration of the combustion state immediately after the engine start.

SUMMARY OF THE INVENTION

The present invention was made contemplating the above-described points, and an object of the present invention is to provide a throttle valve control system, which can improve a response characteristic corresponding to an acceleration demand of the driver while certainly preventing deterioration of the combustion state immediately after the engine start.

To attain the above object, the present invention provides a throttle valve control system for an internal combustion engine which controls an opening of a throttle valve of the engine so that the opening coincides with a target opening. The throttle valve control system includes regulation value setting means, and target opening setting means. The regulation value setting means sets a regulation value of a change amount of the throttle valve opening according to at least a temperature parameter indicative of a temperature of the engine. The target opening setting means sets the target opening within a range defined by the regulation value. The regulation value setting means includes limit value setting means and transition control means. The limit value setting means sets an upper limit value and a lower limit value of the regulation value according to the temperature parameter. The transition control means performs a transition control in which the regulation value is set according to an elapsed time period after start of the engine so as to change from the lower limit value to the upper limit value.

With this configuration, the upper limit value and the lower limit value of the regulation value of the throttle valve opening change amount are set according to the temperature parameter indicative of the engine temperature, and the regulation value is set according to the elapsed time period after start of the engine so as to gradually change from the lower limit value to the upper limit value. Accordingly, the regulation value is set to a value in the vicinity of the lower limit value immediately after start of the engine, thereby certainly preventing a misfire. Further, the regulation value gradually increases toward the upper limit value as the temperature in the combustion chamber increases with the time lapse after start of the engine. Therefore, the response performance for the acceleration demand of the driver can be improved.

Preferably, the transition control means performs the transition control according to an initial temperature parameter indicative of a temperature of the engine at the beginning of starting the engine and a number of ignitions performed after start of the engine.

With this configuration, the transition control from the lower limit value to the upper limit value is performed according to the initial temperature parameter indicative of the engine temperature at the beginning of starting the engine and the number of ignitions performed after start of the engine. The engine temperature at the beginning of starting the engine and the number of ignitions are significantly correlative with the temperature in the combustion chamber. Therefore, by performing the transition control according to the initial temperature parameter and the number of ignitions, the throttle valve opening control can be performed according to a change in the temperature in the combustion chamber of the engine, thereby preventing excessive limitation of the throttle valve opening speed.

Preferably, the engine is an engine which is configured to use a fuel containing alcohol.

With this configuration, both of the misfire prevention and the drivability improvement can be attained in the engine in which the fuel containing alcohol is used and a misfire easily occurs.

Preferably, the throttle valve control system further includes correcting means for changing the target opening to a predetermined throttle valve opening which is required for maintaining an idling condition of the engine, when the target opening set by the target opening setting means is less than the predetermined throttle valve opening.

With this configuration, when the target opening is less than the predetermined throttle valve opening required for maintaining the idling condition of the engine, the target opening is changed to the predetermined throttle valve opening. Therefore, the combustion state in the idling condition is prevented from becoming unstable.

Preferably, the limit value setting means setting an upper limit value and a lower limit value of the regulation value according to the temperature parameter and a concentration of alcohol in the fuel.

With this configuration, the lower limit value and the upper limit value are set to values according to the concentration of alcohol in the fuel. Accordingly, both of the misfire prevention and the drivability improvement can be attained when the fuel of high alcohol concentration which easily invites a misfire is used, and excessive limitation of the throttle valve opening speed can be avoided when the concentration of alcohol is comparatively low and a misfire may not easily occur.

BRIEF DESCRIPTION OF THE DRAWINGS

FIGS. 9A and 9B show maps referred to in the process of FIG. 8;

FIG. 10 is a flowchart for illustrating a calculation method of an alcohol concentration parameter (KREFBS)

DETAILED DESCRIPTION OF THE PREFERRED EMBODIMENTS

First Embodiment

Preferred embodiments of the present invention will now be described with reference to the drawings.

Figure 1:
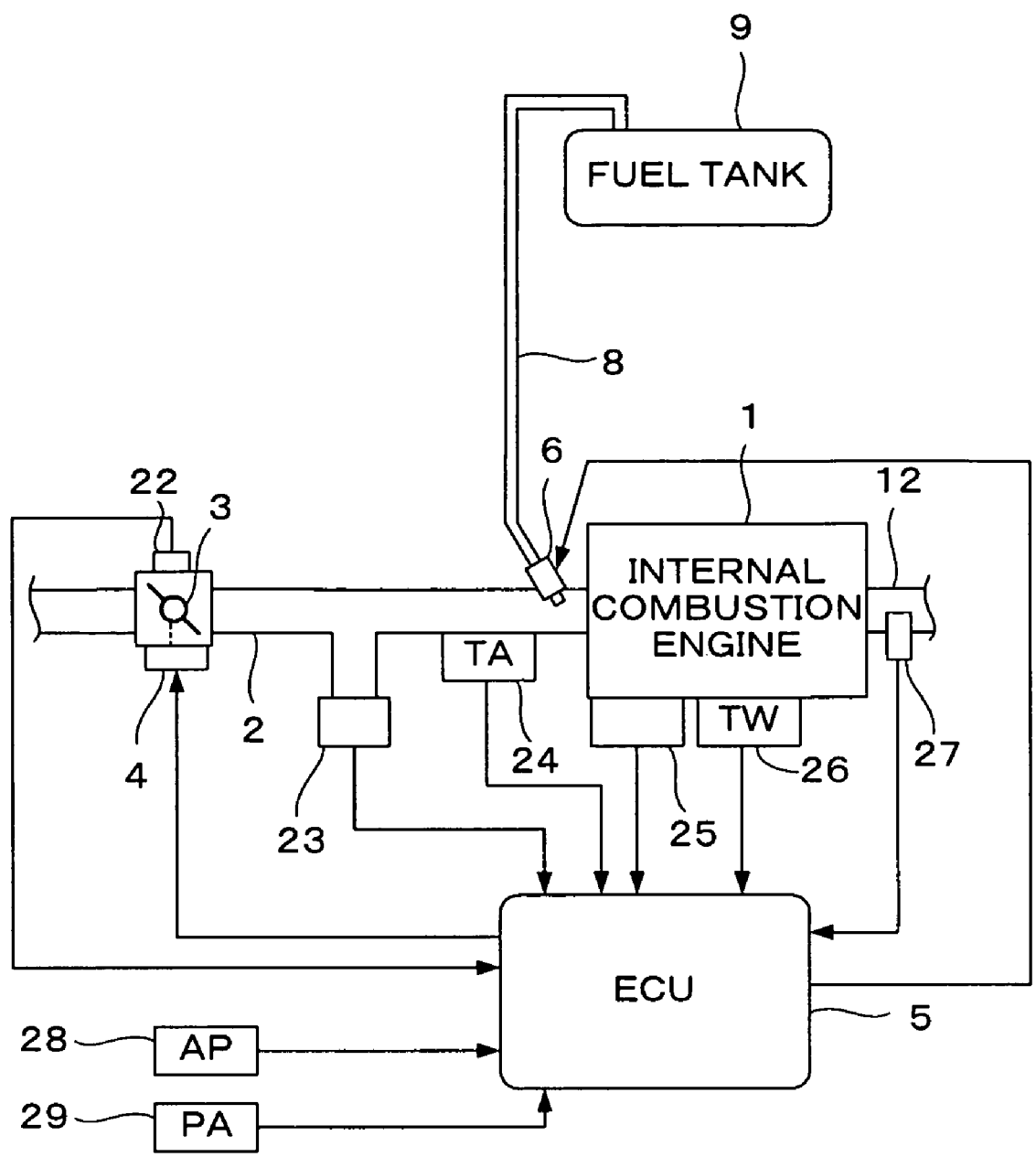
FIG. 1 shows a configuration of an internal combustion engine and a control system therefor according to an embodiment of the present invention.

FIG. 1 is a schematic diagram showing a configuration of an internal combustion engine and a control system therefor according to one embodiment of the present invention. The internal combustion engine (hereinafter referred to as "engine") 1 is a 4-cylinder engine which can be operated using alcohol, gasoline, or gasohol (mixture of alcohol and gasoline) as fuel. The engine 1 has an intake pipe 2 provided with a throttle valve 3. An actuator 4 for actuating the throttle valve 3 can be connected to the throttle valve 3, and the actuator 4 is connected to an electronic control unit (hereinafter referred to as "ECU") 5. The ECU 5 controls an opening TH of the throttle valve 3 through the actuator 4. A throttle valve opening sensor 22 for detecting a throttle valve opening TH can be connected to the throttle valve 3, and the detection signal of the throttle valve opening sensor 22 is supplied to the ECU 5.

The fuel injection valves 6 can be inserted into the intake pipe 2 at locations intermediate between the cylinder block of the engine 1 and the throttle valve 3 and slightly upstream of the respective intake valves (not shown). The fuel injection valves 6 can be connected to a fuel tank 9 through a fuel passage 8.

The fuel injection valves 6 can be electrically connected to the ECU 5. A valve opening period and a valve opening timing of each fuel injection valve 6 is controlled by a signal from the ECU 5. The intake pipe 2 can be provided with an intake pressure sensor 23 for detecting an intake pressure PBA and an intake air temperature sensor 24 for detecting an intake air temperature TA downstream of the throttle valve 3. The detection signals of these sensors are supplied to the ECU 5.

The engine 1 is provided with a crank angle position sensor 25 for detecting a rotational angle of the crankshaft (not shown) of the engine 1, and a signal corresponding to the detected rotational angle of the crankshaft is supplied to the ECU 5. The crank angle position sensor 25 can also include a cylinder discrimination sensor which outputs a pulse (hereinafter referred to as "CYL pulse") at a predetermined crank angle position for a specific cylinder of the engine 1. The crank angle position sensor 25 also includes a top dead center (TDC) sensor which outputs a TDC pulse at a crank angle position before a TDC of a predetermined crank angle starts at an intake stroke in each cylinder (i.e., at every 180 deg crank angle in the case of a-four-cylinder engine) and a crank angle (CRK) sensor for generating one pulse (hereinafter referred to as "CRK pulse") with a CRK period (e.g., a period of 6 degs, shorter than the period of generation of the TDC pulse). The CYL pulse, the TDC pulse and the CRK pulse are supplied to the ECU 5. The CYL, TDC and CRK pulses can be used to control the various timings, such as the fuel injection timing and the ignition timing, and to detect an engine rotational speed NE.

An engine coolant temperature sensor 26 for detecting an engine coolant temperature TW is mounted on the body of the engine 1, and a detection signal is supplied to the ECU 5. An oxygen concentration sensor (hereinafter referred to as "LAF sensor") 27 for detecting an oxygen concentration in exhaust gases can be provided in the exhaust pipe 12 of the engine 1, and a detection signal of the LAF sensor 27 is supplied to the ECU 5.

An accelerator sensor 28 and an atmospheric pressure sensor 29 are connected to the ECU 5. The accelerator sensor 28 detects a depression amount AP of an accelerator pedal of the vehicle driven by the engine 1 (the depression amount will be hereinafter referred to as "accelerator operation amount"). The atmospheric pressure sensor 29 detects an atmospheric pressure PA. The detection signals of these sensors are supplied to the ECU 5.

The ECU 5 can include an input circuit having various functions including a function of shaping the waveforms of input signals from the various sensors, a function of correcting the voltage levels of the input signals to a predetermined level, and a function of converting analog signal values into digital signal values. The ECU 5 can further include a central processing unit (hereinafter referred to as "CPU"), a memory circuit, and an output circuit. The memory circuit preliminarily stores various operating programs to be executed by the CPU and the results of computation or the like by the CPU. The output circuit can supply drive signals to the fuel injection valves 6, the actuator 4, and the spark plug (not shown) in each cylinder.

The ECU 5 can calculate a target opening THO of the throttle valve 3 according to an engine operating condition defined by operating parameters such as the accelerator pedal operation amount AP and the engine rotational speed NE, and controls the actuator 4 so that the detected throttle valve opening TH coincides with the target opening THO.

Figure 2:
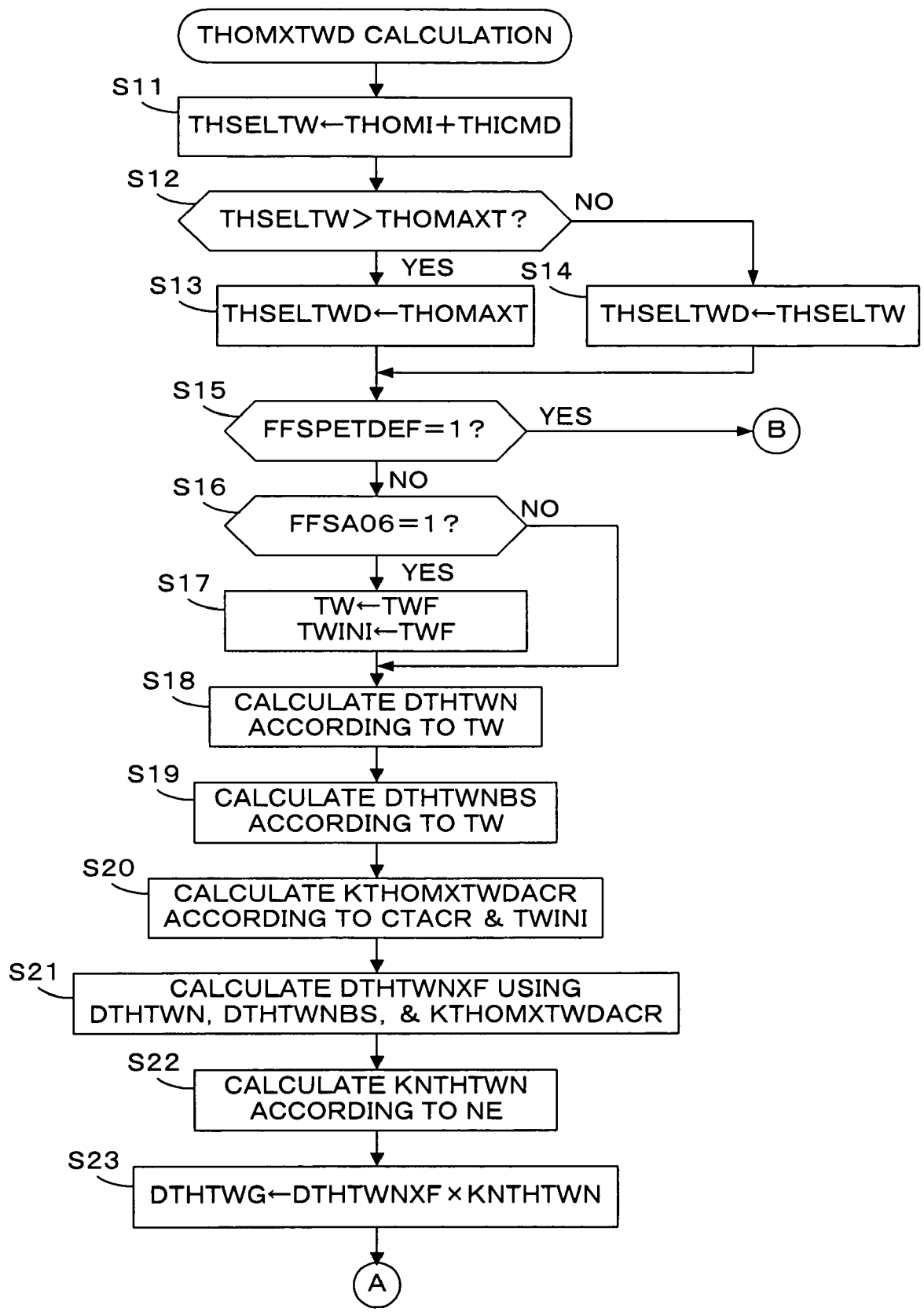
FIGS. 2 and 3 show a flowchart of a process for calculating an incremental amount regulation maximum opening (THOMXTWD) which is a parameter for regulating an increasing speed of a throttle valve opening.
Figure 3:
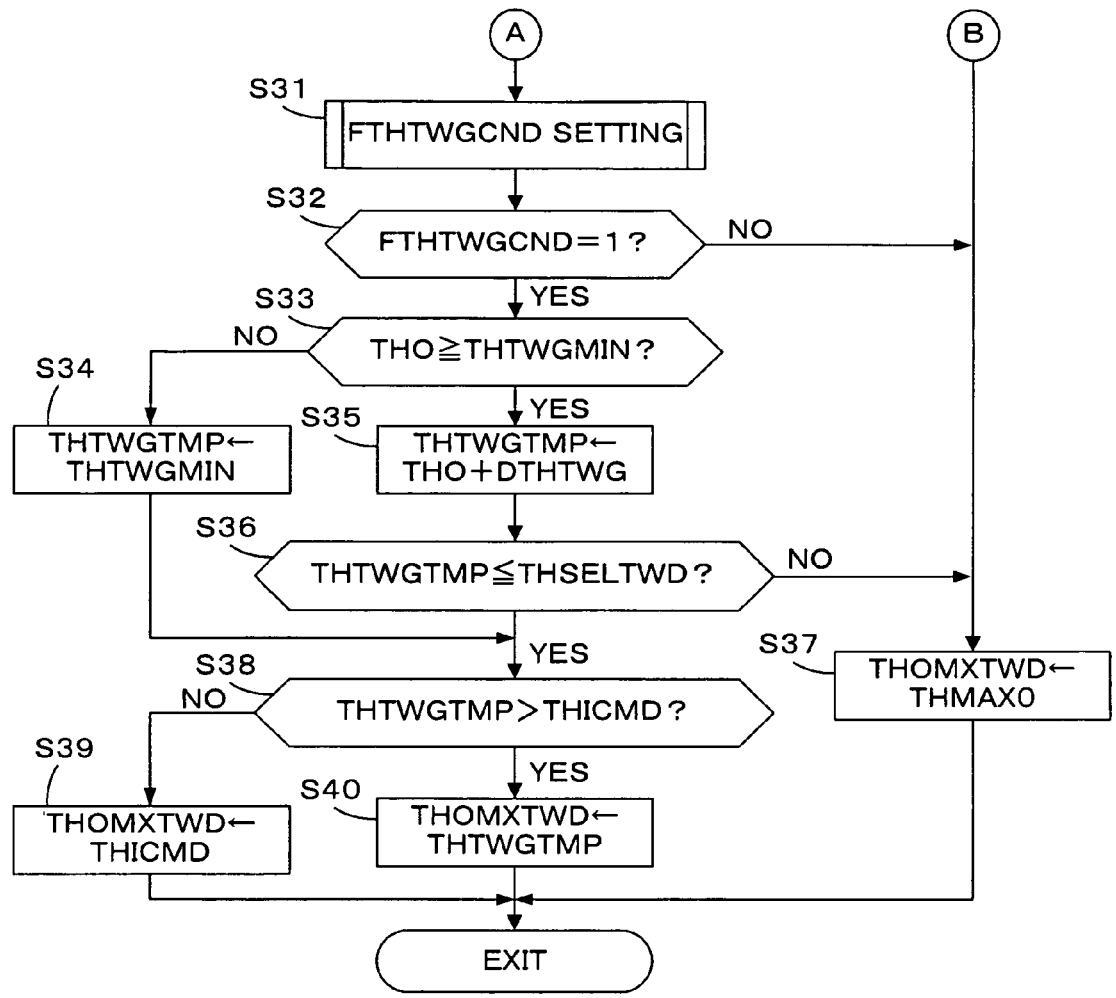

FIGS. 2 and 3 show one example of a flowchart of a process for calculating an incremental amount regulation maximum opening THOMXTWD which is a parameter for regulating an increasing speed of the throttle valve opening TH, according to one embodiment of the invention. This process is executed by the CPU in the ECU 5 at predetermined time intervals (e.g., 10 milliseconds). The incremental amount regulation maximum opening THOMXTWD is a parameter for regulating an incremental amount of the throttle valve opening TH per unit time period, i.e., the increasing speed of the throttle valve opening TH, immediately after start of the engine.

In step S11, an idle opening THICMD can be added to a command opening THOMI which is calculated according to the accelerator pedal operation amount AP and the engine rotational speed NE, to calculate a demand opening THSELTW. The idle opening THICMD is a minimum throttle valve opening required for maintaining the idling condition of the engine 1.

In step S12, it can be determined whether or not the demand opening THSELTW is greater than an upper limit value THOMAXT (preceding value) which is the minimum value of maximum openings calculated by other processes (not shown). If the answer to step S12 is affirmative (YES), a limited demand opening THSELTWD can be set to the upper limit value THOMAXT (step S13). On the other hand, if the answer to step S12 is negative (NO), the limited demand opening THSELTWD can be set to the demand opening THSELTW (step S14).

In step S15, it can be determined whether or not a DBW failure flag FFSPETDEF is equal to "1". The DBW failure flag FFSPETDEF is set to "1" when a failure of the actuating device of the throttle valve 3 (for example, a failure of the actuator 22) is detected. If the answer to step S15 is affirmative (YES), the process can proceed to step S37 (FIG. 3), in which the incremental amount regulation maximum opening THOMXTWD is set to a maximum value THMAX0. The maximum value THMAX0 is set to a maximum value of the throttle valve opening TH. Therefore, the regulation by the incremental amount regulation maximum opening THOMXTWD will not be substantially performed after execution of step S37.

If FFSPETDEF is equal to "0" in step S15, it is determined whether or not a coolant temperature sensor failure flag FFSA06 is equal to "1" (step S16). The coolant temperature sensor failure flag FFSA06 can be set to "1" when a failure of the coolant temperature sensor 26 is detected. If FFSA06 is equal to "1", the coolant temperature TW and an initial coolant temperature TWINI are set to a predetermined coolant temperature THF (e.g., −40 degrees centigrade) (step S17), and the process proceeds to step S18. The initial coolant temperature TWINI is a coolant temperature detected and stored at the beginning of starting the engine 1. If the answer to step S16 is negative (NO), the process immediately proceeds to step S18. In this case, the detected coolant temperature TW and the stored initial coolant temperature TWINI are applied to the calculation of step S18 to S20 described below.

Figure 5A:
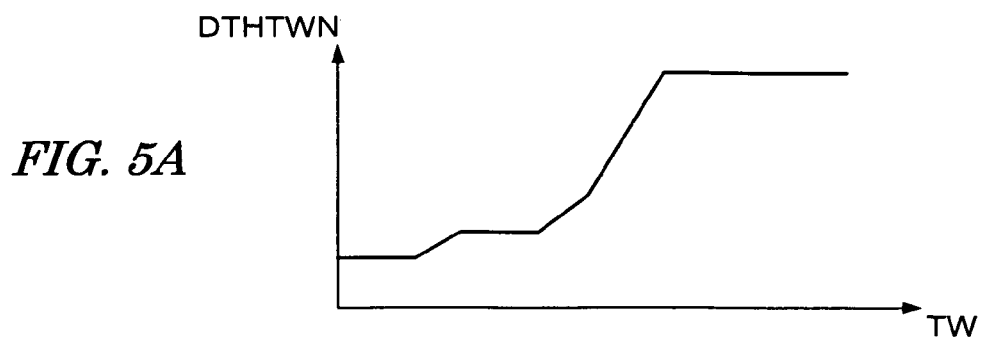
FIGS. 5A-5D show tables and a map referred to in the process of FIGS. 2 to 4.

In step S18, a DTHTWN table shown in FIG. 5A can be retrieved according to the coolant temperature TW, to calculate an upper limit change amount DTHTWN. The DTHTWN table is basically set so that the upper limit change amount DTHTWN increases as the coolant temperature TW increases. The upper limit change amount DTHTWN corresponds to an acceptable increasing speed of the throttle valve opening after a predetermined time period (e.g., 10 seconds) has elapsed from the time the engine start has been completed (from the time when the cranking has finished and the self-sustaining operation of the engine starts).

Figure 5B:
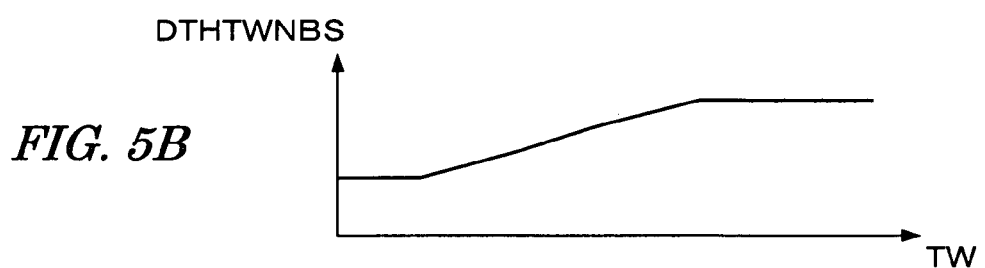

In step S19, a DTHTWNBS table shown in FIG. 5B is retrieved according to the coolant temperature TW, to calculate a lower limit change amount DTHTWNBS. The DTHTWNBS table can be basically set so that the lower limit change amount DTHTWNBS increases as the coolant temperature TW increases. The relationship that DTHTWN is greater than DTHTWNBS is satisfied at the same coolant temperature TW. The lower limit change amount DTHTWNBS corresponds to an acceptable increasing speed of the throttle valve opening immediately after start of the engine.

Figure 5C:
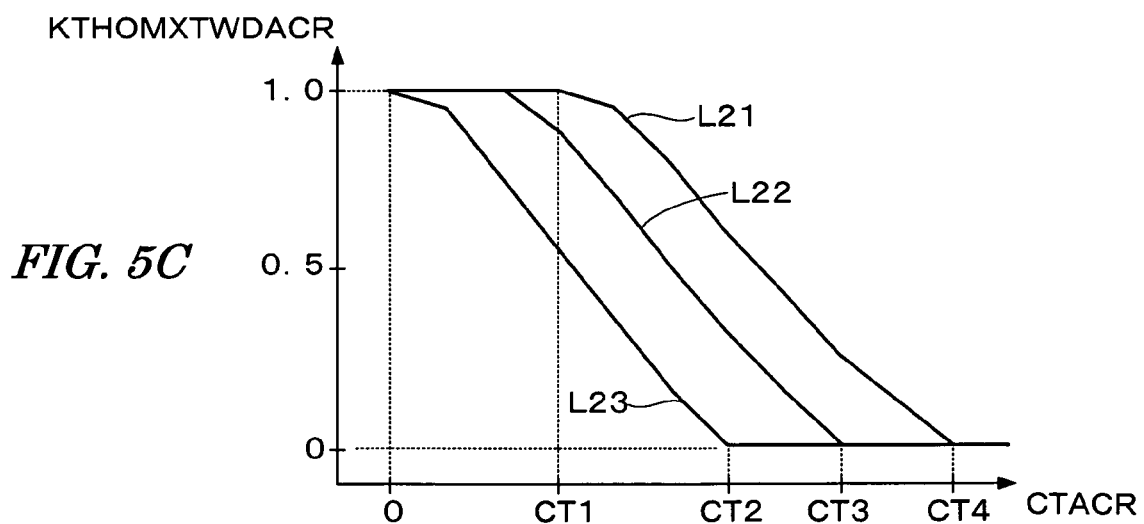

In step S20, a KTHOMXTWDACR map shown in FIG. 5C can be retrieved according to an ignition number CTACR and the initial coolant temperature TWINI, to calculate a transition coefficient KTHOMXTWDACR. The ignition number CTACR is a number of ignitions performed after the time the starting of the engine 1 has completed. In FIG. 5C, the line L21 corresponds to the case where the initial coolant temperature TWINI is equal to "−10 degrees centigrade"; the line L22 corresponds to the case where the initial coolant temperature TWINI is equal to "20 degrees centigrade"; and the line L23 corresponds to the case where the initial coolant temperature TWINI is equal to "70 degrees centigrade". That is, in this example the KTHOMXTWDACR map is set so that the transition coefficient KTHOMXTWDACR decreases as the initial coolant temperature TWINI increases, and the transition coefficient KTHOMXTWDACR decreases as the ignition number CTACR increases. "CT1" to "CT4" shown in FIG. 5C are respectively set, for example, to values of "300", "600", "800" and "1000". It is to be noted that when the initial coolant temperature TWINI is equal to a value other than "−10 degrees centigrade", "20 degrees centigrade", and "70 degrees centigrade", the transition coefficient KTHOMXTWDACR is calculated by the interpolation or the extrapolation.

In step S21, the upper limit change amount DTHTWN, the lower limit change amount DTHTWNBS, and the transition coefficient KTHOMXTWDACR can be applied to the following equation (1), to calculate a basic change amount DTHTWNXF.

$$DTHTWNXF = DTHTWN - KTHOMXTWDACR \times (DTHTWN - DTHTWNBS) \quad (1)$$

Figure 5D:
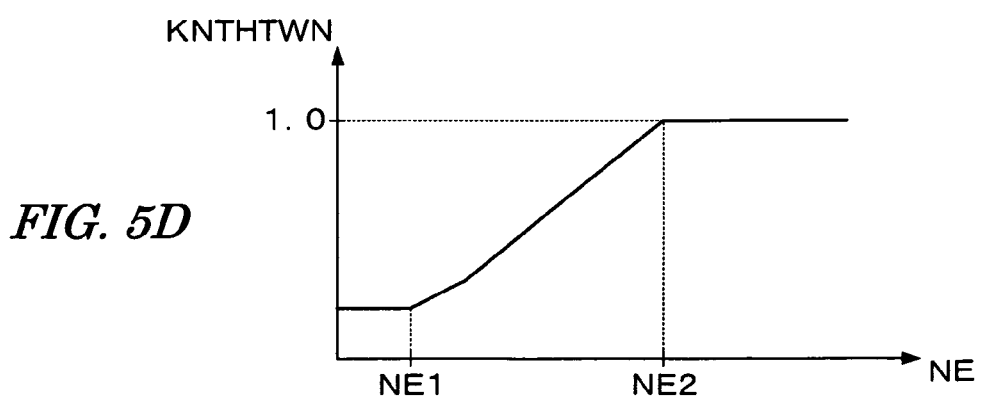

In step S22, a KNTHTWN table shown in FIG. 5D is retrieved according to the engine rotational speed NE to calculate a rotational speed correction coefficient KNTHTWN. The KNTHTWN table can be set so that the rotational speed correction coefficient KNTHTWN decreases as the engine rotational speed NE decreases in the range from a predetermined rotational speed NE1 to NE2, (for example, a range from 1000 to 3000 rpm). The KNTHTWN table can be set contemplating that deterioration of the combustion state due to a rapid opening of the throttle valve, may more easily occur as the engine rotational speed NE decreases. By applying the rotational speed correction coefficient KNTHTWN, deterioration of the combustion state can be prevented especially in the operating condition where the engine rotational speed NE is low.

In step S23, the rotational speed correction coefficient KNTHTWN is multiplied to the basic change amount DTHTWNXF, to calculate a regulation change amount DTHTWG.

Figure 4:
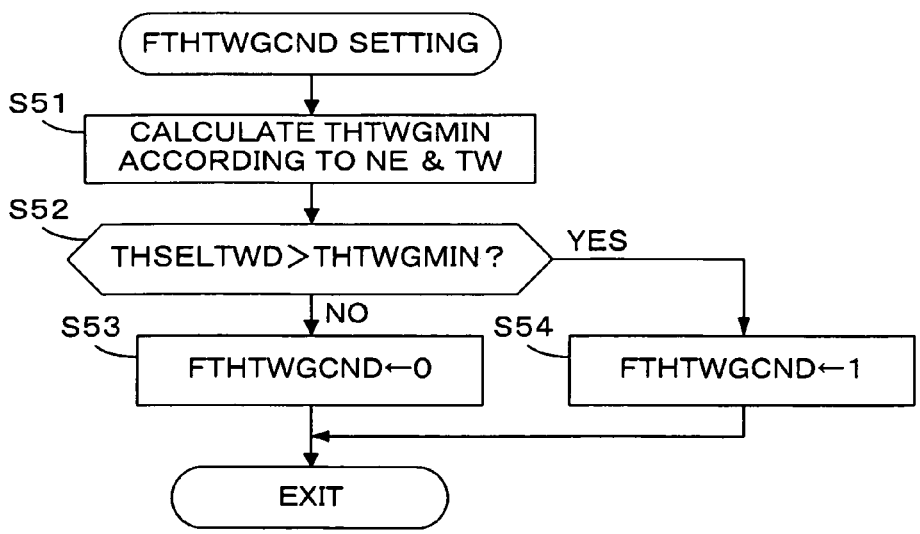
FIG. 4 is a flowchart of a flag setting subroutine executed in the process of FIG. 3.

In step S31 of FIG. 3, a FTHTWGCND setting process shown in FIG. 4 is executed, to set a gradual increase control execution flag FTHTWGCND.

In step S51 of FIG. 4, a THTWGMIN map (not shown) is retrieved according to the engine rotational speed NE and the coolant temperature TW, to calculate a determination opening THTWGMIN. The THTWGMIN map can be basically set so that the determination opening THTWGMIN increases as the engine rotational speed NE increases, and the determination opening THTWGMIN increases as the coolant temperature TW increase. Further, the determination opening THTWGMIN is set within a range where the opening is comparatively low (for example, about 3 to 15 degrees).

In step S52, it is determined whether or not the limited demand opening THSELTWD is greater than the determination opening THTWGMIN. If the answer to step S52 is affirmative (YES), it is determined that a gradual increase control of the throttle valve opening should be performed and the gradual increase control execution flag FTHTWGCND is set to "1" (step S54). If the answer to step S52 is negative (NO), it is determined that it is not necessary to perform the gradual increase control of the throttle valve opening, and the gradual increase control execution flag FTHTWGCND is set to "0" (step S53).

Referring back to FIG. 3, it is determined in step S32 whether or not the gradual increase control execution flag FTHTWGCND is equal to "1". If the answer to step S32 is negative (NO), the process proceeds to step S37, i.e., the gradual increase control is not performed. If FTHTWGCND is equal to "0", i.e., the answer to step S32 is negative (NO), the engine rotational speed NE is comparatively high or the engine coolant temperature TW is comparatively high, and the demanded throttle valve opening is comparatively small. Accordingly, a stable combustion state can be maintained, and suppressing the increasing speed of the throttle valve is not necessary. Therefore, excessive limitation of the throttle valve opening speed can be avoided by steps S31 and S32. It is preferable to calculate the determination opening THTWGMIN based on both of the engine rotational speed NE and the coolant temperature TW as described above. However, the determination opening THTWGMIN may be calculated based on any one of the engine rotational speed NE and the coolant temperature TW. In this case, the determination opening THTWGMIN is set so as to increase as the engine rotational speed NE increases, or the determination opening THTWGMIN is set so as to increase as the coolant temperature TW increases.

If the gradual increase control execution flag FTHTWGCND is equal to "1" in step S32, it is determined whether or not the target opening THO (preceding value) is equal to or greater than the determination opening THTWGMIN (step S33). If the answer to step S33 is negative (NO), a temporary value THTWGTMP can be set to the determination opening THTWGMIN (step S34), and the process proceeds to step S38.

If THO is equal to or greater than THTWGMIN in step S33, the target opening THO (preceding value) and the regulation change amount DTHTWG can be applied to the following equation (2), to calculate the temporary value THTWGTMP (step S35).

$$THTWGTMP = THO + DTHTWG \quad (2)$$

In step S36, it can be determined whether or not the calculated temporary value THTWGTMP is equal to or less than the limited demand opening THSELTWD. If the answer to step S36 is negative (NO), it is not necessary to perform the gradual increase control. Accordingly, the process proceeds to step S37. On the other hand, if THTWGTMP is equal to or less than THSELTWD in step S36, the process proceeds to step S38.

In step S38, it is determined whether or not the temporary value THTWGTMP is greater than the idle opening THICMD. If the answer to step S38 is affirmative (YES), the incremental amount regulation maximum opening THOMXTWD is set to the temporary value THTWGTMP (step S40). If THTHGTMP is equal to or less than THICMD in step S38, the incremental amount regulation maximum opening THOMXTWD is set to the idle opening THICMD (step S39).

Figure 6:
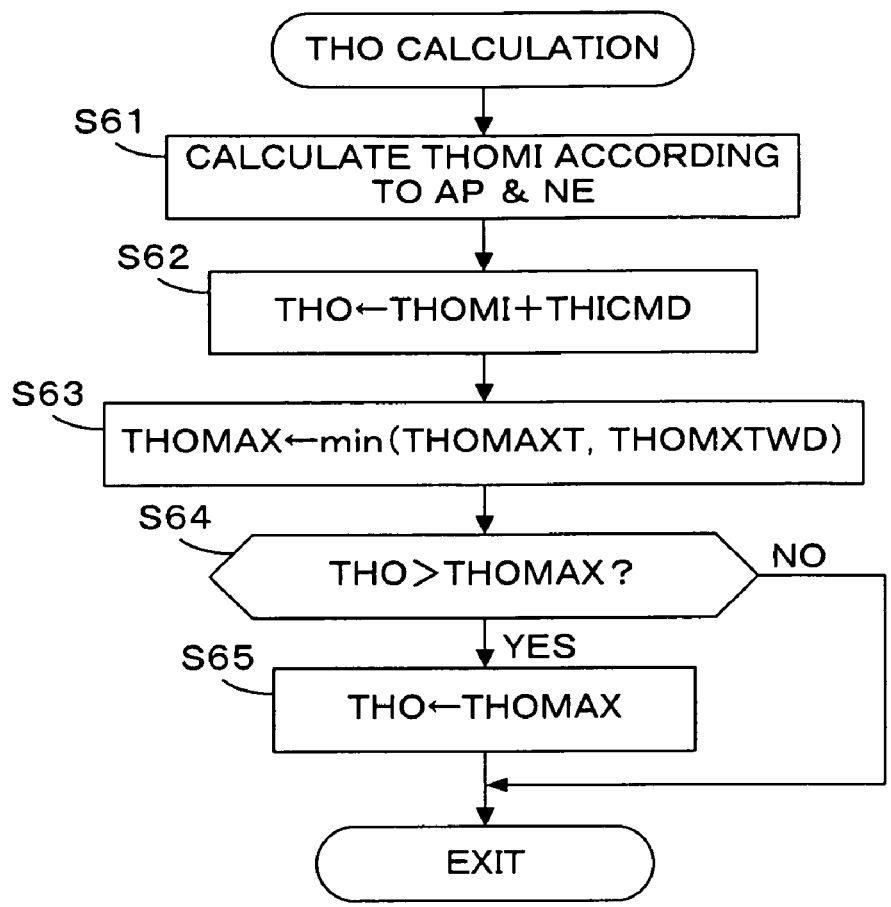
FIG. 6 is a flowchart of a process for calculating a target opening (THO) of the throttle valve.

FIG. 6 is one example of a flowchart of the process for calculating the target opening THO. This process is executed by the CPU in the ECU 5 after execution of the process shown in FIGS. 2 and 3.

In step S61, the command opening THOMI can be calculated according to the accelerator pedal operation amount AP and the engine rotational speed NE. Basically, the command opening THOMI is set so as to increase as the accelerator pedal operation amount AP increases. In step S62, the idle opening THICMD is added to the command opening THOMI, to calculate the target opening THO.

In step S63, the maximum opening THOMAX can be calculated by selecting the small one of the incremental amount regulation maximum opening THOMXTWD calculated by the process of FIGS. 2 and 3 and the upper limit value THOMAXT which is the minimum value of the maximum openings calculated by other processes.

In step S64, it is determined whether or not the target opening THO is greater than the maximum opening THOMAX. If the answer to step S64 is affirmative (YES), the target opening THO is set to the maximum opening THOMAX (step S65). If THO is equal to or less than THOMAX in step S64, the process immediately ends.

If the incremental amount (increasing speed) of the command opening THOMI is greater compared with the incremental amount (increasing speed) of the target opening determined by the regulation change amount DTHTWG, the target opening THO is set to the incremental amount regulation maximum opening THOMXTWD calculated by adding the regulation change amount DTHTWG to the preceding value of the target opening THO. Therefore, the increasing speed of the target opening THO can be regulated according to the regulation change amount DTHTWG, and the increasing speed of the throttle valve opening TH can be regulated. Such regulation may include suppression.

Figure 7:
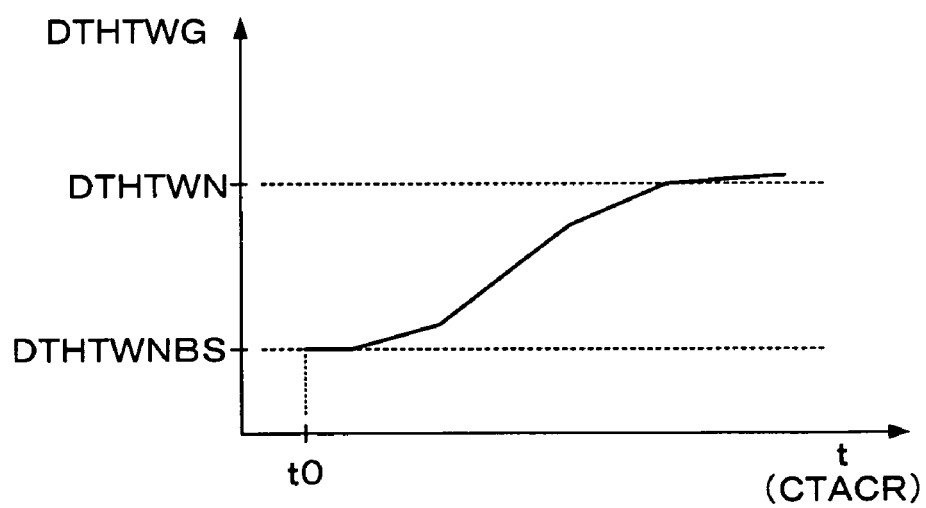
FIG. 7 is a time chart for illustrating a control by the process of FIGS. 2 and 3.

As described above, in this embodiment, the upper limit change amount DTHTWN and lower limit change amount DTHTWNBS are set according to the coolant temperature TW. The regulation change amount DTHTWG is set using the transition coefficient KTHOMXTWDACR, which can be set according to the ignition number CTACR indicative of the elapsed time period after start of the engine, so as to gradually change from the lower limit change amount DTHTWNBS to the upper limit change amount DTHTWN as shown in FIG. 7 (time t0 shows the time when the engine starting has been completed). Therefore, the regulation change amount DTHTWG is set to a value in the vicinity of the lower limit change amount DTHTWNBS immediately after start of the engine, which makes it possible to certainly prevent a misfire. Further, the regulation change amount DTHTWG gradually increases toward the upper limit change amount DTHTWN as the temperature of the combustion chamber of the engine with time lapse after start of the engine, which make it possible to improve the response performance for the acceleration demand of the driver.

Further, the initial coolant temperature TWINI and the ignition number CTACR are strongly correlated with the temperature in the combustion chamber of the engine. Therefore, the transition coefficient KTHOMXTWDACR is set by taking into consideration not only the ignition number CTACR but also the initial coolant temperature TWINI. Consequently, the control according to the transition of the temperature in the combustion chamber of the engine becomes possible, thereby avoiding the regulation beyond necessity.

Further, when the temporary value THTWGTMP is less than the idle opening THICMD which is the minimum throttle valve opening required for maintaining the idling condition, the incremental amount regulation maximum opening THOMXTWD can be changed to the idle opening THICMD. Therefore, the combustion state is prevented from becoming unstable in the idling condition.

It is clear from the above description that the effects of the invention are obtained in this embodiment, when the incremental amount regulation maximum opening THOMXTWD is less than the upper limit value THOMAXT determined from the maximum openings set by other processes, i.e., when the target opening THO is set to the incremental amount regulation maximum opening THOMXTWD.

In this embodiment, the ECU 5 can constitute the regulation value setting means, the target opening setting means, the limit value setting means, the transition control means, and the correcting means. Specifically, the process of FIGS. 2 and 3 correspond to the regulation value setting means, and the process of FIG. 6 corresponds to the target opening setting means. Further, steps S18 and S19 of FIG. 2 correspond to the limit value setting means, steps S20 to S23 and steps S31 to S35 correspond to the transition control means, and steps S38 and S39 correspond to the correcting means.

The present invention is not limited to the embodiment described above, and various modifications may be made. For example, in the above-described embodiment, an example is shown in which the controlled object is an internal combustion engine wherein fuel containing alcohol is used. The present invention is applicable also to an internal combustion engine wherein only gasoline is used as fuel. Further, the present invention is applicable also to an internal combustion engine having fuel supply means which consists of the following two systems: a first system for supplying main fuel containing alcohol and a second system for supplying auxiliary fuel containing gasoline of a comparatively high concentration.

Second Embodiment

This embodiment is applicable in particular to an internal combustion engine wherein alcohol or alcohol mixtures are used as fuel. In this embodiment, an alcohol concentration parameter KREFBS indicative of a concentration of alcohol in the fuel is calculated, and the upper limit change amount DTHTWN and the lower limit change amount DTHTWNBS are set according to the alcohol concentration parameter KREFBS.

This embodiment is the same as the first embodiment except for the points described below.

Figure 8:
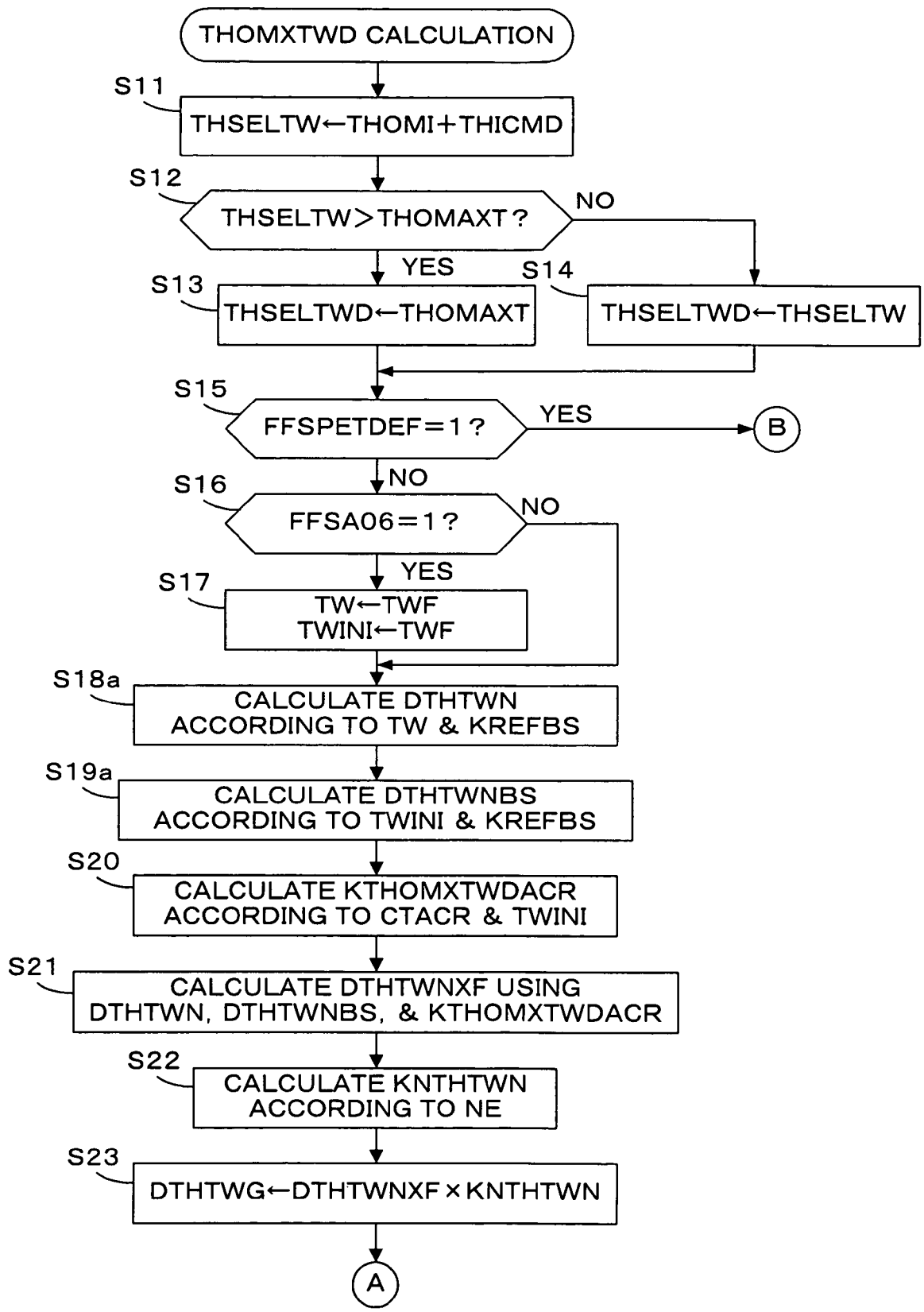
FIG. 8 is a flowchart (second embodiment) of a process for calculating the incremental amount regulation maximum opening (THOMXTWD) which is a parameter for regulating the increasing speed of the throttle valve opening.

FIG. 8 is obtained by changing steps S18 and S19 of FIG. 2 in the first embodiment respectively to steps S18a and S19a.

In step S18a, a DTHTWN map shown in FIG. 9A is retrieved according to the coolant temperature TW and the alcohol concentration parameter KREFBS, to calculate the upper limit change amount DTHTWN. The alcohol concentration parameter KREFBS, which can be calculated by the process shown in FIG. 10, is a parameter indicative of a concentration of alcohol in the fuel in use. In this embodiment, the alcohol concentration parameter KREFBS is set so as to take values of "1.2" and "0.7" corresponding to the alcohol concentrations of 100% and 0% (gasoline 100%) respectively.

The lines L1, L2, and L3 in FIG. 9A correspond respectively to predetermined values KREFBS1 (for example, a value corresponding to an alcohol concentration of about 22%), KREFBS2 (for example, a value corresponding to an alcohol concentration of about 64%), and KREFBS3 (for example, a value corresponding to an alcohol concentration of about 96%). The relationship of KREFBS1<KREFBS2<KREFBS3 is satisfied. It is to be noted that when the alcohol concentration parameter KREFBS takes a value other than predetermined values KREFBS1, KREFBS2 and KREFBS3, the upper limit change amount DTHTWN can be calculated by interpolation or extrapolation.

Basically, the DTHTWN map shown in FIG. 9A is set so that the upper limit change amount DTHTWN increases as the coolant temperature TW increases and the upper limit change amount DTHTWN decreases as the alcohol concentration parameter KREFBS increases.

In step S19a, a DTHTWNBS map shown in FIG. 9B is retrieved according to the initial coolant temperature TWINI and the alcohol concentration parameter KREFBS, to calculate the lower limit change amount DTHTWNBS.

The lines L11, L12, and L13 in FIG. 9B correspond respectively to the predetermined values KREFBS1, KREFBS2, and KREFBS3. When the alcohol concentration parameter KREFBS takes a value other than predetermined values KREFBS1, KREFBS2 and KREFBS3, the lower limit change amount DTHTWNBS is calculated by the interpolation or the extrapolation.

Basically, the DTHTWNBS map shown in FIG. 9B is set so that the lower limit change amount DTHTWNBS increases as the initial coolant temperature TWINI increases and the lower limit change amount DTHTWNBS decrease as the alcohol concentration parameter KREFBS increases. The relationship of DTHTWN>DTHTWNBS is satisfied for the same value of the alcohol concentration parameter KREFBS.

Figure 11:
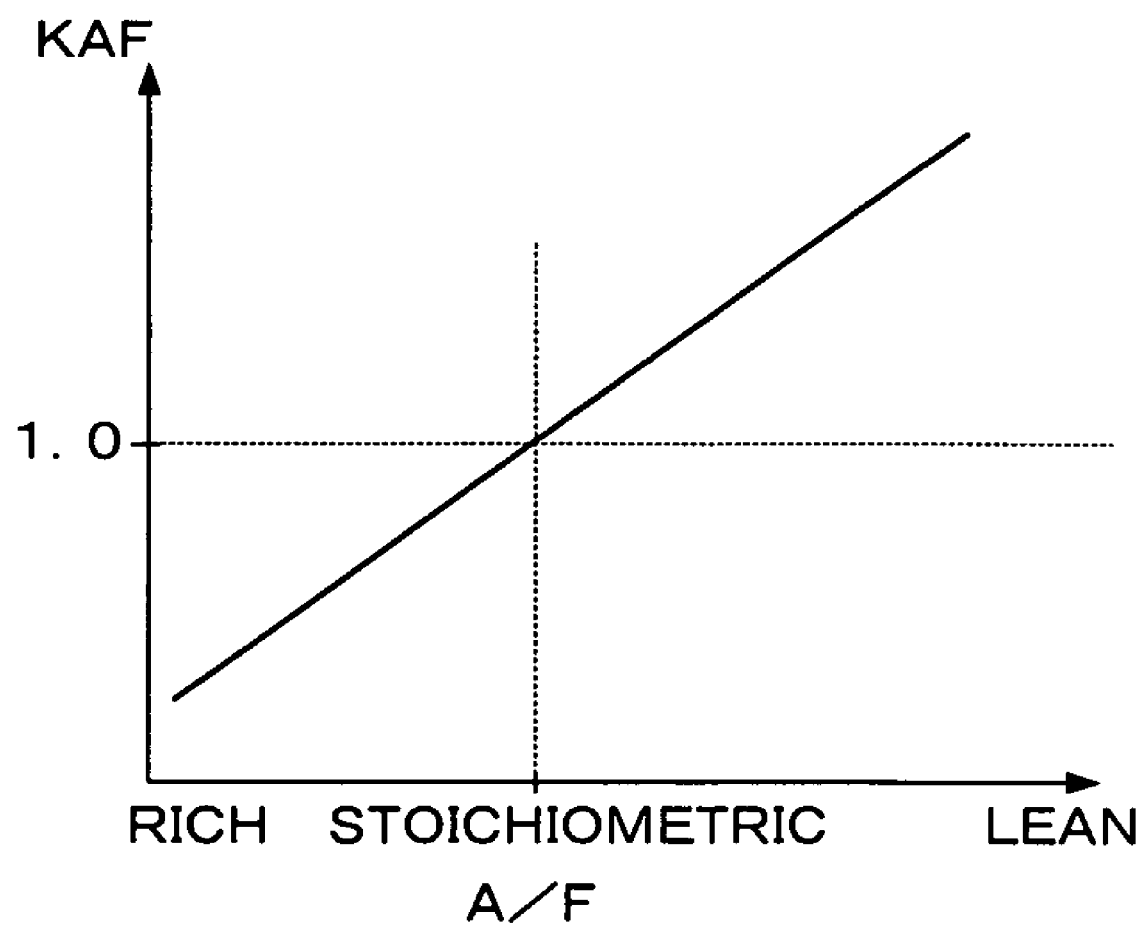
FIG. 11 shows a table referred to in the process of FIG. 10.

Next, a method for calculating the alcohol concentration parameter KREFBS is described with reference to FIGS. 10 and 11. The calculation of the alcohol concentration parameter KREFBS is performed when the evaporated fuel is not purged to the intake system of the engine 1 and the fuel supply to the engine 1 is not interrupted. The calculated alcohol concentration parameter KREFBS is stored in the memory whose stored value is maintained during stoppage of the engine. The alcohol concentration parameter KREFBS read out from the memory is used upon next starting of the engine.

In step S71, an air-fuel ratio A/F of an air-fuel mixture in the combustion chamber of the engine is calculated from the output of the LAF sensor 27. In step S72, a KAF table shown in FIG. 11 is retrieved according to the air-fuel ratio A/F, to calculate a feedback coefficient KAF. The KAF table can beset so that the feedback coefficient KAF increases as the air-fuel ratio A/F increases.

In step S73, the feedback coefficient KAF is applied to the following equation (3), to calculate an averaged feedback coefficient KREFX. In the equation (3), "CREF" is an averaging coefficient set to a value between "0" and "1", and "KREFX" on the right side is the preceding calculated value.

$$KREFX = CREF \times KAF + (1-CREF) \times KREFX \quad (3)$$

In step S74, the averaged feedback coefficient KREFX is applied to the following equation (4), to update the alcohol concentration parameter KREFBS. "KREFBS" on the right side of the equation (4) is the preceding calculated value.

$$KREFBS = KREFBS \times KREFX \quad (4)$$

The calculated feedback coefficient KAF and alcohol concentration parameter KREFBS are applied to the following equation (5), to calculate a fuel injection amount TOUT. "TIM" in the equation (5) is a basic fuel amount calculated according to the engine rotational speed NE and the intake pressure PBA, and "K1" is another correction coefficient set according to the engine operating condition.

$$TOUTM = TIM \times KAF \times KREFBS \times K1 \quad (5)$$

The detected air-fuel ratio A/F increases as the alcohol concentration in the fuel becomes higher, and accordingly the feedback coefficient KAF increases, to make the alcohol concentration parameter KREFBS increase. If the alcohol concentration in the fuel does not change, the feedback coefficient KAF decreases with increase in the alcohol concentration parameter KREFBS, and the averaged feedback coefficient KREFX converges to "1.0". Consequently, the alcohol concentration parameter KREFBS converges to a value corresponding to the alcohol concentration.

As described above, in this embodiment, the upper limit change amount DTHTWN and the lower limit change amount DTHTWNBS are set according to the coolant temperature TW and the alcohol concentration parameter KREFBS indicative of the concentration of alcohol in the fuel in use. The regulation change amount DTHTWG is set using the transition coefficient KTHOMXTWDACR which is set according to the ignition number CTACR indicative of the elapsed time period after start of the engine, so as to gradually change from the lower limit change amount DTHTWNBS to the upper limit change amount DTHTWN as shown in FIG. 7 (time t0 shows the time the starting of the engine has been completed). Therefore, the same effect as the first embodiment can be obtained. Some additional effects can also be obtained. That is, the upper limit change amount DTHTWN and the lower limit change amount DTHTWNBS can be set to values according to the concentration of alcohol in the fuel. Therefore, both of the misfire prevention and the drivability improvement can be attained when the fuel of high alcohol concentration which easily invites a misfire is used, and excessive limitation of the throttle valve opening speed can be avoided when the concentration of alcohol is comparatively low and a misfire may not easily occur.

In this embodiment, steps S18a and S19a of FIG. 8 correspond to the limit value setting means.

The present invention is not limited to the embodiments described above, and various modifications may be made. For example, in the above-described second embodiment, an example in which the controlled object is an internal combustion engine wherein fuel containing alcohol is used is shown. The present invention is applicable also to an internal combustion engine having fuel supply means which can include the following two systems: a first system for supplying main fuel containing alcohol and a second system for supplying auxiliary fuel containing gasoline of a comparatively high concentration. In this case, the concentration of alcohol in the main fuel is used as the alcohol concentration which is applied to the calculation of the upper limit change amount DTHTWN and the lower limit change amount DTHTWNBS.

Further, in the above-described second embodiment, the DTHTWNBS map shown in FIG. 9B is set according to the initial coolant temperature TWINI and the alcohol concentration parameter KREFBS. Alternatively, the DTHTWNBS map shown in FIG. 9B may be set according to the coolant temperature TW and the alcohol concentration parameter KREFBS.

Further, in the above-described embodiments, the coolant temperature TW is used as a parameter indicative of the engine temperature. Alternatively, the lubricating oil temperature or the temperature of the predetermined portion of the engine 1 may be used.

The present invention can be applied to a throttle valve control for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A throttle valve control system for an internal combustion engine which controls an opening of a throttle valve of said engine so that the opening coincides with a target opening, said throttle valve control system comprising:

regulation value setting means for setting a regulation value of a change amount of the throttle valve opening according to at least a temperature parameter indicative of a temperature of said engine; and target opening setting means for setting the target opening within a range defined by the regulation value, wherein said regulation value setting means includes limit value setting means and transition control means, said limit value setting means setting an upper limit value and a lower limit value of the regulation value according to the temperature parameter, and said transition control means performing a transition control in which the regulation value is set according to an elapsed time period after start of said engine so as to change from the lower limit value to the upper limit value.

2. A throttle valve control system according to claim 1, wherein said transition control means performs the transition control according to an initial temperature parameter indicative of a temperature of said engine at a beginning of starting said engine and a number of ignitions performed after start of said engine.

3. A throttle valve control system according to claim 1, whereinsaid engine comprises an engine configured to use a fuel containing alcohol.

4. A throttle valve control system according to claim 1, further comprising correcting means for changing the target opening to a predetermined throttle valve opening for maintaining an idling condition of said engine, when the target opening set by said target opening setting means is less than the predetermined throttle valve opening.

5. A throttle valve control system according to claim 1, wherein said change from the lower limit value to the upper limit value comprises a gradual change.

6. A throttle valve control system for an internal combustion engine which controls an opening of a throttle valve of said engine so that the opening coincides with a target opening, said throttle valve control system comprising:

regulation value setting means for setting a regulation value of a change amount of the throttle valve opening according to at least a temperature parameter indicative of a temperature of said engine; and target opening setting means for setting the target opening within a range defined by the regulation value, wherein said engine comprises an engine which is configured to use a fuel containing alcohol, and said regulation value setting means includes limit value setting means and transition control means, said limit value setting means setting an upper limit value and a lower limit value of the regulation value according to the temperature parameter and a concentration of alcohol in the fuel, and said transition control means performing a transition control in which the regulation value is set according to an elapsed time period after start of said engine so as to change from the lower limit value to the upper limit value.

7. A throttle valve control system according to claim 6, wherein said change from the lower limit value to the upper limit value comprises a gradual change.

8. A throttle valve control method for an internal combustion engine which controls an opening of a throttle valve of said engine so that the opening coincides with a target opening, said throttle valve control method comprising the steps of:
   a) setting a regulation value of a change amount of the throttle valve opening according to at least a temperature parameter indicative of a temperature of said engine; and
   b) setting the target opening within a range defined by the regulation value, wherein said step a) includes the steps of:
   c) setting an upper limit value and a lower limit value of the regulation value according to the temperature parameter; and
   d) performing a transition control in which the regulation value is set according to an elapsed time period after start of said engine so as to change from the lower limit value to the upper limit value.

9. A throttle valve control method according to claim 8, wherein the transition control is performed according to an initial temperature parameter indicative of a temperature of said engine at the beginning of starting said engine and a number of ignitions performed after start of said engine.

10. A throttle valve control method according to claim 8, said engine is an engine which is configured to use a fuel containing alcohol.

11. A throttle valve control method according to claim 8, further including the step of e) changing the target opening to a predetermined throttle valve opening which is required for maintaining an idling condition of said engine, when the target opening set in said step b) is less than the predetermined throttle valve opening.

12. A throttle valve control system according to claim 8, wherein said change from the lower limit value to the upper limit value comprises a gradual change.

13. A throttle valve control method for an internal combustion engine which controls an opening of a throttle valve of said engine so that the opening coincides with a target opening, said throttle valve method system comprising the steps of:
   a) setting a regulation value of a change amount of the throttle valve opening according to at least a temperature parameter indicative of a temperature of said engine; and
   b) setting the target opening within a range defined by the regulation value,
   wherein said engine is an engine which is configured to use a fuel containing alcohol,
   and said step a) includes the steps of:
   c) setting an upper limit value and a lower limit value of the regulation value according to the temperature parameter and a concentration of alcohol in the fuel; and
   d) performing a transition control in which the regulation value is set according to an elapsed time period after start of said engine so as to change from the lower limit value to the upper limit value.

14. A throttle valve control method according to claim 13, wherein said change from the lower limit value to the upper limit value comprises a gradual change.

15. A throttle valve control system configured to control an opening of a throttle valve of an internal combustion engine so that the opening coincides with a target opening, said system comprising:

a regulation value setting unit configured to set a regulation value of a change amount of the throttle valve opening according to at least a temperature parameter indicative of a temperature of said engine; and a target opening setting unit configured to set the target opening within a range defined by the regulation value, wherein the regulation value setting-unit includes a limit value setting unit and a transition controller, said limit value setting unit configured to set an upper limit value and a lower limit value of the regulation value according to the temperature parameter, and wherein said transition controller is configured to perform a transition control in which the regulation value is set according to an elapsed time period after start of said engine so as to change from the lower limit value to the upper limit value.

16. A throttle valve control system according to claim 15, wherein said change from the lower limit value to the upper limit value comprises a gradual change.

17. A throttle valve control system according to claim 15, wherein said transition controller is configured to perform the transition control according to an initial temperature parameter indicative of a temperature of said engine at a beginning of starting said engine, and a number of ignitions performed after start of said engine.

18. A throttle valve control system according to claim 15, wherein said engine comprises an engine which is configured for fuel containing alcohol.

19. A throttle valve control system according to claim 15, further comprising a correcting unit which is configured to change a target opening to a predetermined throttle valve opening which is configured to maintain an idling condition of said engine, when the target opening set by target opening setting means is less than the predetermined throttle valve opening.

20. A throttle valve control system configured to control an opening of a throttle valve of an internal combustion engine such that the opening coincides with the target opening, said throttle valve control system comprising:

a regulation value setting unit configured to set a regulation value of a change amount of the throttle valve opening according to at least a temperature parameter indicative of a temperature of said engine; and a target opening setting unit which is configured to set the target opening within a range defined by the regulation value, wherein said engine comprises an engine which is configured to use a fuel containing alcohol, and wherein said regulation value setting unit includes a limit value setting unit and a transition controller, said limit value setting unit being configured to set an upper limit value and a lower limit value of the regulation value according to the temperature parameter and a concentration of alcohol in the fuel, and wherein said transition controller is configured to perform a transition control in which the regulation value is set according to an elapsed time period after start of said engine so as to change from the lower limit value to the upper limit value.

21. A throttle valve control system according to claim 20, wherein said change from the lower limit value to the upper limit value comprises a gradual change.

* * * * *